(12) United States Patent
Tiedemann, Jr. et al.

(10) Patent No.: US 8,184,611 B2
(45) Date of Patent: *May 22, 2012

(54) MOBILE STATION ASSISTED TIMING SYNCHRONIZATION IN A CDMA COMMUNICATION SYSTEM

(75) Inventors: Edward G. Tiedemann, Jr., Concord, MA (US); Charles E. Wheatley, III, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 826 days.

This patent is subject to a terminal disclaimer.

(21) Appl. No.: 11/939,455

(22) Filed: Nov. 13, 2007

(65) Prior Publication Data

US 2008/0285539 A1 Nov. 20, 2008

Related U.S. Application Data

(63) Continuation of application No. 09/841,893, filed on Apr. 25, 2001, now Pat. No. 7,295,531, which is a continuation of application No. 09/008,203, filed on Jan. 16, 1998, now Pat. No. 6,307,840, which is a continuation-in-part of application No. 08/933,888, filed on Sep. 19, 1997, now Pat. No. 5,872,774.

(51) Int. Cl.
    *H04J 3/06* (2006.01)
(52) U.S. Cl. ............... 370/350; 370/324; 370/504
(58) Field of Classification Search ............ 370/331, 370/332, 334, 204, 320; 455/36, 437, 438, 455/441, 505, 503, 504, 506
    See application file for complete search history.

(56) References Cited

U.S. PATENT DOCUMENTS 4,718,109 A 1/1988 Breeden et al.
(Continued)

FOREIGN PATENT DOCUMENTS

EP 0766417 4/1997
(Continued)

OTHER PUBLICATIONS

European Search Report, EP07010283, European Patent Office, The Hague, Jul. 18, 2007.
(Continued)

*Primary Examiner* — Hassan Phillips
*Assistant Examiner* — Anez Ebrahim
(74) *Attorney, Agent, or Firm* — Francois A. Pelaez; Sayed H. Beladi

(57) ABSTRACT

In the present invention, the slave base station attains synchronization with the reference base station through messages transmitted from and received by a mobile station either in the soft handoff region between the reference base station and the slave base station or within a range which allows the mobile station to communicate with the slave base station. When the mobile station is not in communication with both the reference base station and the slave base station, then the round trip delay between the mobile station and the reference base station is measured by the reference base station. The reference base station communicates the PN code used by the mobile station over the reverse link to the slave base station. The slave base station acquires the signal from the mobile station and determines when the signal from the mobile station arrives. The slave base station then makes an estimate as to the length of the delay between transmission of a signal from the mobile station to the slave base station. Based upon these measurements and estimates, the slave base station determines the error which is present in the slave base station system time.

36 Claims, 9 Drawing Sheets

U.S. PATENT DOCUMENTS

| | | | |
|---|---|---|---|
| 4,901,307 A | | 2/1990 | Gilhousen et al. |
| 5,056,109 A | * | 10/1991 | Gilhousen et al. ............ 370/342 |
| 5,101,501 A | | 3/1992 | Gilhousen et al. |
| 5,103,459 A | | 4/1992 | Gilhousen et al. |
| 5,109,390 A | | 4/1992 | Gilhousen et al. |
| 5,212,804 A | | 5/1993 | Choate |
| 5,267,261 A | | 11/1993 | Blakeney et al. |
| 5,295,152 A | | 3/1994 | Gudmundson et al. |
| 5,448,570 A | | 9/1995 | Toda et al. |
| 5,519,710 A | | 5/1996 | Otsuka |
| 5,519,759 A | | 5/1996 | Heineck et al. |
| 5,561,618 A | | 10/1996 | Dehesh |
| 5,600,754 A | | 2/1997 | Gardner et al. |
| 5,613,211 A | | 3/1997 | Matsuno |
| 5,642,377 A | | 6/1997 | Chung et al. |
| 5,644,591 A | | 7/1997 | Sutton |
| 5,646,991 A | * | 7/1997 | Sih ........................... 379/406.08 |
| 5,654,979 A | | 8/1997 | Levin et al. |
| 5,677,908 A | | 10/1997 | Oura |
| 5,722,080 A | | 2/1998 | Kondo |
| 5,727,064 A | * | 3/1998 | Reeds, III ..................... 380/270 |
| 5,745,484 A | | 4/1998 | Scott |
| 5,828,659 A | | 10/1998 | Teder et al. |
| 5,867,527 A | | 2/1999 | Ziv et al. |
| 5,872,774 A | | 2/1999 | Wheatley et al. |
| 5,930,244 A | | 7/1999 | Ariyoshi et al. |
| 6,014,376 A | | 1/2000 | Abreu et al. |
| 6,031,829 A | | 2/2000 | Dupuy et al. |
| 6,072,847 A | * | 6/2000 | Dupuy et al. ................. 375/356 |
| 6,151,311 A | | 11/2000 | Wheatley, III et al. |
| 6,307,840 B1 | | 10/2001 | Wheatley, III et al. |
| 6,799,019 B1 | | 9/2004 | Eilts |
| 7,295,531 B2 | * | 11/2007 | Wheatley et al. ............. 370/328 |
| 2002/0001299 A1 | * | 1/2002 | Petch et al. ................... 370/350 |
| 2003/0064752 A1 | | 4/2003 | Adachi et al. |
| 2004/0224719 A1 | * | 11/2004 | Nounin et al. ............. 455/553.1 |
| 2005/0136990 A1 | | 6/2005 | Hardacker et al. |
| 2007/0037600 A1 | | 2/2007 | Fukuda |

FOREIGN PATENT DOCUMENTS

| | | |
|---|---|---|
| GB | 2290926 | 1/1996 |
| SU | 1474860 A1 | 4/1989 |
| WO | 9430024 | 12/1994 |
| WO | 9526094 | 9/1995 |
| WO | WO9610873 | 4/1996 |
| WO | WO9944306 | 9/1999 |

OTHER PUBLICATIONS

European Search Report, EP07010283, The Hague, Jul. 18, 2007.

Wheatley C: "CDMA'S Dependence on Good Timing and Related Issues", Proceedings of the 1996 IEEE International Frequency Control Symposium. (50th Anniversary), Honolulu, Hawaii, Jun. 5-7, 1996, pp. 1211-1218, XP000699058, Institute of Electrical and Electronics Engineers.

International Search Report—PCT/US98/19467, International Searching Authority, European Patent Office, Apr. 23, 1999.

* cited by examiner

MOBILE STATION ASSISTED TIMING SYNCHRONIZATION IN A CDMA COMMUNICATION SYSTEM

CROSS-REFERENCE

This application is a continuation application of co-pending application Ser. No. 09/841,893, filed Apr. 25, 2001 and entitled "Mobile Station Assisted Timing Synchronization in a CDMA Communication System," which is a continuation of application Ser. No. 09/008,203, now U.S. Pat. No. 6,307,840, filed Jan. 16, 1998, which in turn is a continuation-in-part of application Ser. No. 08/933,888, now U.S. Pat. No. 5,872,774, filed Sep. 19, 1997.

BACKGROUND OF THE INVENTION

1. Field of the Invention

The present invention relates to communication systems. More particularly, the present invention relates to a novel and improved method and apparatus for synchronizing a base station by means of signals transmitted from a mobile station which is concurrently in communication with a synchronized base station.

2. Description of the Related Art

The use of code division multiple access (CDMA) modulation techniques is but one of several techniques for facilitating communications in which a large number of system users are present. Although other techniques, such as time division multiple access (TDMA), frequency division multiple access (FDMA) and AM modulation schemes such as amplitude companded single sideband (ACSSB) are known, CDMA has significant advantages over these other modulation techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS" and U.S. Pat. No. 5,103,459, entitled "SYSTEM AND METHOD FOR GENERATING SIGNAL WAVEFORMS IN A CDMA CELLULAR TELEPHONE SYSTEM", both of which are assigned to the assignee of the present invention and are incorporated by reference. The method for providing CDMA mobile communications was standardized in the United States by the Telecommunications Industry Association in TIA/EIA/IS-95-A entitled "Mobile Station-Base Station Compatibility Standard for Dual-Mode Wideband Spread Spectrum Cellular System", referred to herein as IS-95.

In the just mentioned patents, a multiple access technique is disclosed in which a large number of mobile station users, each having a transceiver, communicate through satellite repeaters or terrestrial base stations (also known as cell base stations or cell-sites) using code division multiple access (CDMA) spread spectrum communication signals. By using CDMA communications, the frequency spectrum can be reused multiple times thus permitting an increase in system user capacity. The use of CDMA techniques result in much higher spectral efficiency than can be achieved using other multiple access techniques.

A method for simultaneously demodulating data that has traveled along different propagation paths from one base station and for simultaneously demodulating data redundantly provided from more than one base station is disclosed in U.S. Pat. No. 5,109,390 (the '390 patent), entitled "DIVERSITY RECEIVER IN A CDMA CELLULAR COMMUNICATION SYSTEM", assigned to the assignee of the present invention and incorporated by reference herein. In the '390 patent, the separately demodulated signals are combined to provide an estimate of the transmitted data which has higher reliability than the data demodulated by any one path or from any one base station.

Handoffs can generally be divided into two categories—hard handoffs and soft handoffs. In a hard handoff, when a mobile station leaves an origination base station and enters a destination base station, the mobile station breaks its communication link with the origination base station and thereafter establishes a new communication link with the destination base station. In soft handoff, the mobile station completes a communication link with the destination base station prior to breaking its communication link with the origination base station. Thus, in soft handoff, the mobile station is redundantly in communication with both the origination base station and the destination base station for some period of time.

Soft handoffs are far less likely to drop calls than hard handoffs. In addition, when a mobile station travels near the coverage boundary of a base station, it may make repeated handoff requests in response to small changes in the environment. This problem, referred to as ping-ponging, is also greatly lessened by soft handoff. The process for performing soft handoff is described in detail in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM" assigned to the assignee of the present invention and incorporated by reference herein.

An improved soft handoff technique is disclosed in U.S. Pat. No. 5,267,261, entitled "MOBILE STATION ASSISTED SOFT HANDOFF IN A CDMA CELLULAR COMMUNICATIONS SYSTEM", which is assigned to the assignee of the present invention and incorporated by reference herein. In the system of the '261 patent, the soft handoff process is improved by measuring the strength of "pilot" signals transmitted by each base station at the mobile station. These pilot strength measurements are of assistance in the soft handoff process by facilitating identification of viable base station handoff candidates.

The base station candidates can be divided into four sets. The first set, referred to as the Active Set, comprises base stations which are currently in communication with the mobile station. The second set, referred to as the Candidate Set, comprises base stations whose signals have been determined to be of sufficient strength to be of use to the mobile station but are not currently being used. Base stations are added to the candidate set when their measured pilot energy exceeds a predetermined threshold $T_{ADD}$. The third set is the set of base stations which are in the vicinity of the mobile station (and which are not included in the Active Set or the Candidate Set). And the fourth set is the Remaining Set which consists of all other base stations.

In IS-95, a base station candidate is characterized by the phase offset of the pseudonoise (PN) sequence of its pilot channel. When the mobile station searches to determine the strength of the pilot signal from a candidate base station it performs a correlation operation wherein the filtered received signal is correlated to a set of PN offset hypotheses. The method and apparatus for performing the correlation operation is described in detail in co-pending U.S. patent application Ser. No. 08/687,694, filed on Jul. 26, 1996, entitled "METHOD AND APPARATUS FOR PERFORMING SEARCH ACQUISITION IN A CDMA COMMUNICATION SYSTEM", which is assigned to the assignee of the present invention and incorporated by reference herein.

The propagation delay between the base station and the mobile station is not known. This unknown delay produces and unknown shift in the PN codes. The searching process attempts to determine the unknown shift in the PN codes. To do this, the mobile station shifts in time the output of its searcher PN code generators. The range of the search shift is called the search window. The search window is centered about a PN shift hypothesis. A base station transmits to the mobile station a message indicating the PN offsets of base station pilots in its physical proximity. The mobile station will center its search window around the PN offset hypothesis.

The appropriate size of the search window depends on several factors including the priority of the pilot, the speed of the searching processors, and the anticipated delay spread of the multipath arrivals. The CDMA standards (IS-95) define three search window parameters. The searching of pilots in both the active and candidate sets is governed by Search Window "A". Neighbor Set pilots are searched over window "N" and Remaining Set pilots over window "R". The searcher window sizes are provided below in Table 1, where a chip is $$\frac{1}{1.2288 \text{ MHz}}.$$

TABLE 1

| SRCH_WIN_A SRCH_WIN_N SRCH_WIN_R | Window Size (PN chips) | SRCH_WIN_A SRCH_WIN_N SRCH_WIN_R | Window Size (PN chips) |
|---|---|---|---|
| 0 | 4 | 8 | 60 |
| 1 | 6 | 9 | 80 |
| 2 | 8 | 10 | 100 |
| 3 | 10 | 11 | 130 |
| 4 | 14 | 12 | 160 |
| 5 | 20 | 13 | 226 |
| 6 | 28 | 14 | 320 |
| 7 | 40 | 15 | 452 |

Window sizing is a trade-off between search speed and the probability of missing a strong path lying outside the search window.

The base station transmits to the mobile station a message which specifies the PN hypotheses that the mobile station should search relative to its own PN offset. For example, the originating base station may instruct the mobile station to search for a pilot 128 PN chips ahead of its own PN offset. The mobile station in response sets its searcher demodulator 128 chips ahead in the output chip cycle and searches for the pilot using a search window centered about the specified offset. Once the mobile is instructed to a search a PN hypothesis to determine the resources available for performing a handoff, it is critical that the PN offset of the destination base station pilot is very close in time to the directed offset. The speed of searching is of critical importance near base station boundaries because delays in completing the necessary searches can result in dropped calls.

In CDMA systems in the United States, base station synchronization is achieved by providing each base station with a Global Positioning Satellite (GPS) receiver. However, there are cases where a base station may not be able to receive the GPS signal. For example, within subways and tunnels the GPS signal is attenuated to a degree that prohibits their use for timing synchronization of base stations or micro base stations. The present invention provides a method and system for providing timing synchronization in these circumstances where a fraction of the network is capable of receiving a centralized timing signal and achieving timing therefrom and a portion of the base stations are not capable of receiving the centralized timing signal.

SUMMARY OF THE INVENTION

The present invention is a novel and improved method and apparatus for time synchronizing a base station which is not capable of receiving a centralized timing signal in a network where some of the base stations are capable of receiving the centralized timing signal. A reference base station has timing synchronization through receipt of a centralized timing signal or other means. In the exemplary embodiment, the reference base station synchronizes using a global positioning satellite (GPS) receiver. Slave base stations lack the capacity to synchronize, because, for example, of an inability to receive the centralized timing signal.

In the present invention, a slave base station attains synchronization with a reference base station through messages transmitted from and received by a mobile station in the soft handoff region between the reference base station and the slave base station. First, the round trip delay between the mobile station and the reference base station is measured by the reference base station. Next, the slave base station searches until it acquires the signal transmitted by the mobile station, referred to as the reverse link signal. In response to the acquisition of the reverse link signal, the slave base station adjusts its timing so that the mobile station can acquire its signal, referred to as a forward link signal. This step may be unnecessary if the timing error in the slave base station is not severe.

Once the mobile station acquires the signal from the slave base station, the mobile station measures and reports the difference between the amount of time it takes a signal to travel from the reference base station to the mobile station and the amount of time it takes a signal to travel from the slave base station to the mobile station. The last measurement necessary is a measurement by the slave base station of the time difference between the time the slave base station received the reverse link signal from the mobile station the time the slave base station transmitted a signal to the mobile station.

A series of computations described in detail herein are performed upon the measured time values to determine the time difference between the slave base station and the reference base station. An adjustment of the slave base station timing is performed in accordance with these computations. It should be noted that, in the preferred embodiment, all of the measurements mentioned are performed during the normal operation of an IS-95 CDMA communication system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Overview of Timing Error Computation

Figure 1:
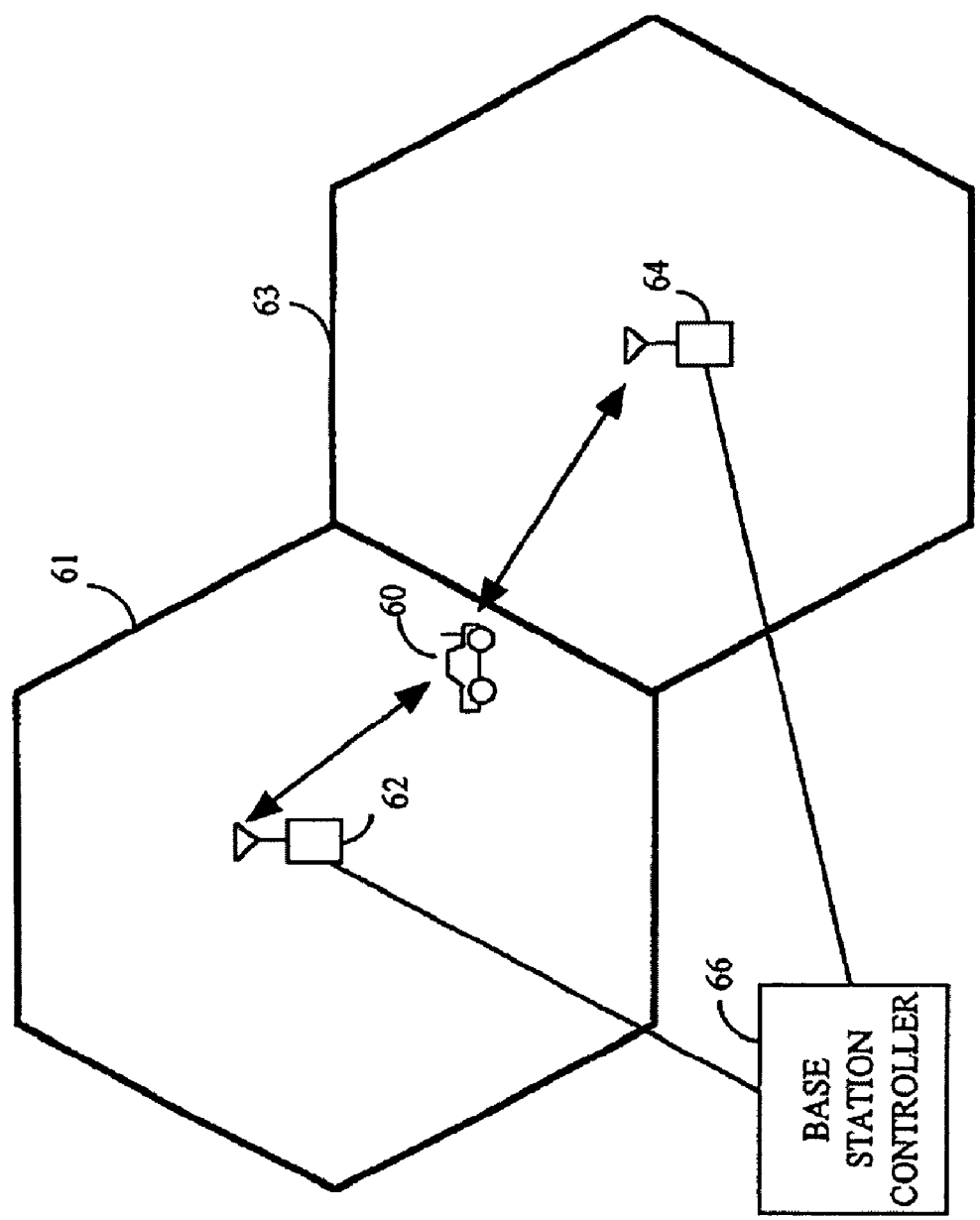
FIG. 1 is a block diagram illustrating the network configuration of a wireless communication system comprising a reference base station and a slave base station.

Referring to FIG. 1, mobile station 60 is in communication with reference base station 62, while it is roughly within the coverage area delineated by base station coverage boundary 61. Reference base station 62 is synchronized to the rest of the network by means of a central timing system such as the global positioning system (GPS). In contrast, slave base station 64, with a coverage area delineated by coverage boundary 63, is not synchronized to the central timing system by independent means, such as the GPS available to base station 62. Base station controller 66 routes calls from the public switched telephone network (PSTN) to a base station 62 or 64 by means of a T1 line or other means. In addition, frequency synchronization is provided to slave base station 64 through T1 lines.

For short time periods, frequency synchronization can be provided with an acceptable degree of accuracy through T1 lines by methods well known in the art. However, problems are common in schemes which rely upon a T1 line for providing frequency information. These problems result in timing errors which can be corrected by use of the present invention. Because of the relationship between phase and frequency, the present invention's intermittent correction of phase will permit the utilization of a less accurate frequency sources when necessary.

Figure 2:
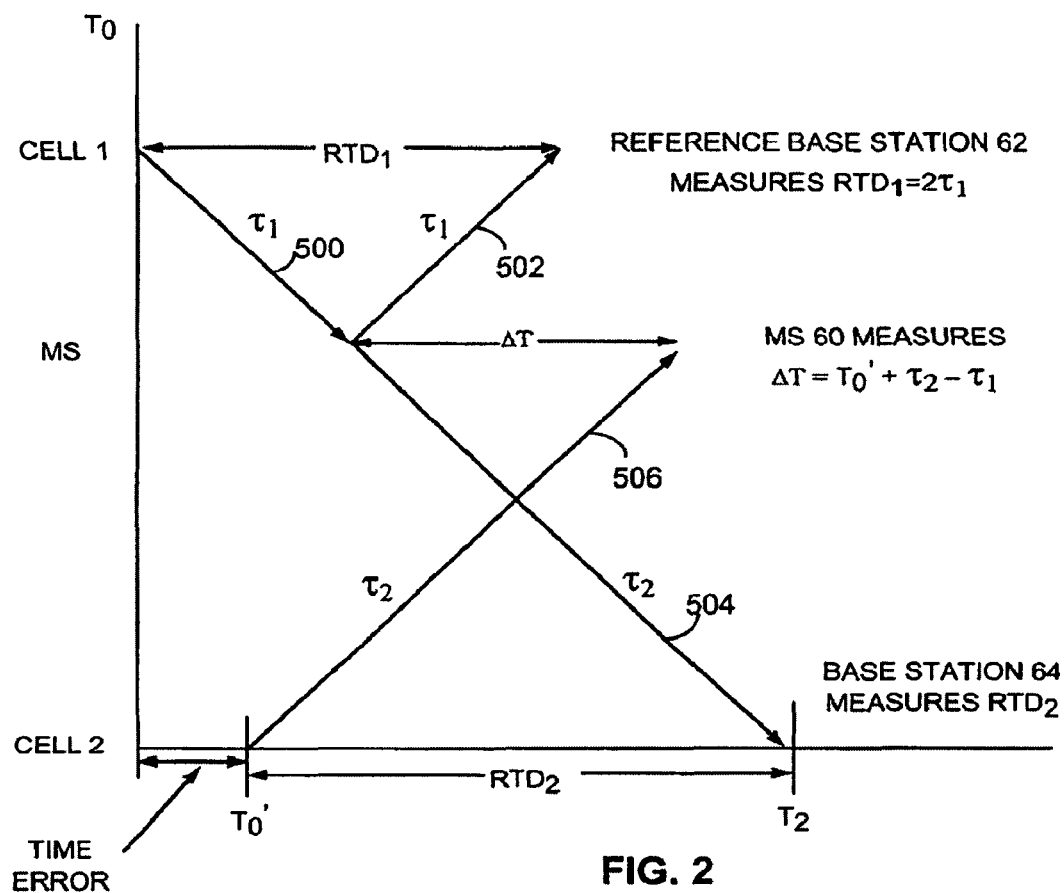
FIG. 2 is a diagram illustrating the various transmissions between the mobile station, the synchronous base station and the asynchronous base station and the corresponding time intervals.

Referring to FIG. 2, an illustration of the transmission and corresponding time intervals used to synchronize the timing of slave base station 64 with the synchronized timing of reference base station 62. Signal path 500 illustrates the transmission of a forward link signal from reference base station 62 to mobile station 60. The time interval over which this transmission occurs is designated as $\tau_1$. At mobile station 60, the start of frame transmissions on the reverse link are time aligned with the start of frame arrivals on the forward link. This time alignment is standardized in IS-95 and incorporated in hardware designed in conformance therewith. Therefore, it should be understood that methods and apparatus for performing this alignment are well known in the art.

Transmission 502 depicts the transmission of a reverse link frame from mobile station 60 to reference base station 62. The time for a signal 500 to travel from base station 62 to mobile station 60 ($\tau_1$) is equal to the time for signal 502 to travel from base station 62 to mobile station 60 (also $\tau_1$). Because base station 62 knows the time at which it transmitted signal 500 and knows the time at which it received signal 502, base station 62 can compute the round trip delay time ($RTD_1$), which is the first value necessary in the computation of the time error ($T_0'-T_0$).

Signal path 504 is the reverse link signal transmission from mobile station 60 traveling along a different propagation path to slave base station 64. The time which it takes signal 504 to travel from mobile station 60 to slave base station 64 is designated as $\tau_2$. The time at which the reverse link signal 504 reaches base station 64 is designated as $T_2$. The time it takes a forward link signal 506 traveling from base station 64 to mobile station 60 is also equal to $\tau_2$. In addition, slave base station 64 can measure the time difference between the time it received the reverse link signal from mobile station 60 and the time it transmitted its forward link signal to mobile station 60. This time difference is designated as $RTD_2$. Knowing these times allows for the computation of the time error ($T_0'-T_0$). The method for computing the time error ($T_0'-T_0$) is described below.

First it can be observed from FIG. 2 that:

$$\tau_2 = \tau_1 + \Delta\tau_2, \text{ and} \tag{1}$$

$$\tau_1 + \Delta T = T_0' + T_2 \tag{2}$$

By manipulating the terms of equations (1) and (2), the following is observed:

$$T_2 + \Delta T = T_0' + 2\cdot\tau_2 \tag{3}$$

$$2\cdot\tau_2 = T_2 - T_0' + \Delta T \tag{4}$$

To simplify the notation, a new variable $RTD_2$ is defined as:

$$RTD_2 = T_2 - T_0' \tag{5}$$

It can be seen that:

$$\tau_2 = \frac{RTD_2}{2} + \frac{\Delta T}{2} \tag{6}$$

Referencing equations with respect to $T_0$:

$$T_2 = T_0 + \tau_1 + \tau_2 \tag{7}$$

Therefore, $$T_2 - T_0 = \tau_1 + \tau_2, \text{ and}$$

$$RTD_2 = 2\cdot\tau_2 - \Delta T \tag{8}$$

By substitution, it can be seen that the time error ($T_0'-T_0$) is equal to:

$$T_0' - T_0 = \tau_1 - \tau_2 + \Delta T \tag{9}$$

$$T_0' - T_0 = \tau_1 - \left[\frac{RTD_2}{2} + \frac{\Delta T}{2}\right] + \Delta T \tag{10}$$

$$T_0' - T_0 = \frac{RTD_1}{2} - \frac{RTD_2}{2} + \frac{\Delta T}{2} \tag{11}$$

$$T_0' - T_0 = \frac{RTD_1 + \Delta T - RTD_2}{2} \tag{12}$$

Once base station 64 knows the amount of its timing error ($T_0'-T_0$), it adjusts its timing so as to synchronize it to the timing of base station 62. These measurements are subject to error, so, in a preferred embodiment, many of the measurements are redundantly made to assure the accuracy of the timing correction.

The method and apparatus for measuring each of the necessary time values in equation (12) is now described.

Measurement of Round Trip Delay ($RTD_1$)

Figure 3:
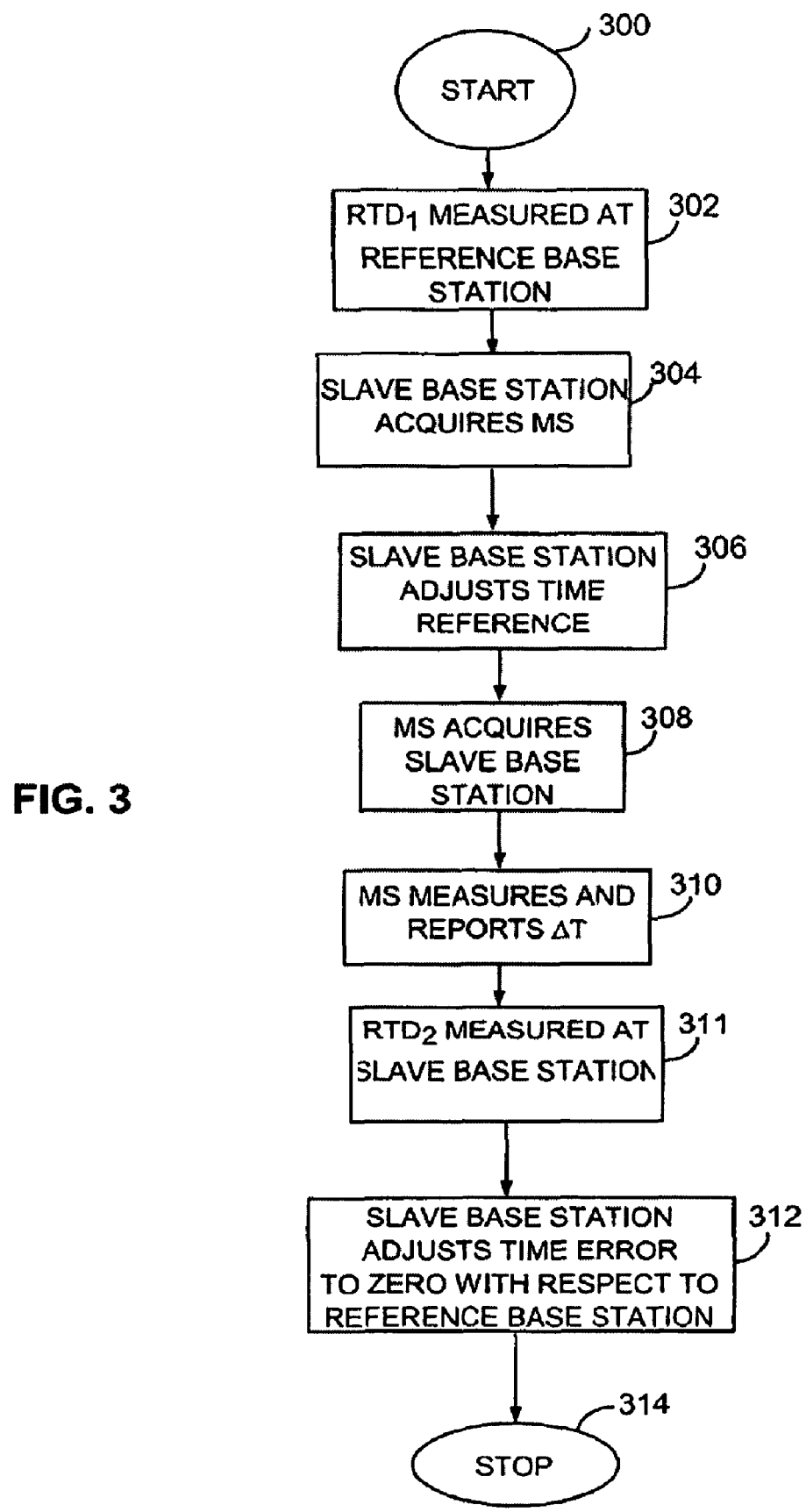
FIG. 3 is a flowchart illustrating the method for synchronizing a base station which is incapable of receiving a centralized timing signal.

FIG. 3 is a flow diagram illustrating the method of the present invention for synchronizing slave base station 64 to the timing of reference base station 62. In step 300, the synchronization method commences, with mobile station 60 in communication with reference base station 62 and within range to conduct communications with slave base station 64. In step 302, the round trip delay (RTD$_1$) time for a signal to travel from reference base station 62 to mobile station 60 and back from mobile station 60 to reference base station 62 is measured. This is done by aligning the frame boundaries of frames being received by mobile station 60 with the frame boundaries of frames being transmitted by mobile station 60. The method and apparatus for providing this alignment is well known in the art. Thus, the round-trip delay (RTD$_1$) is measured as the time difference between the start of frames transmitted by reference base station 62 and the start of frames received by reference base station 62 from mobile station 60.

Figure 4:
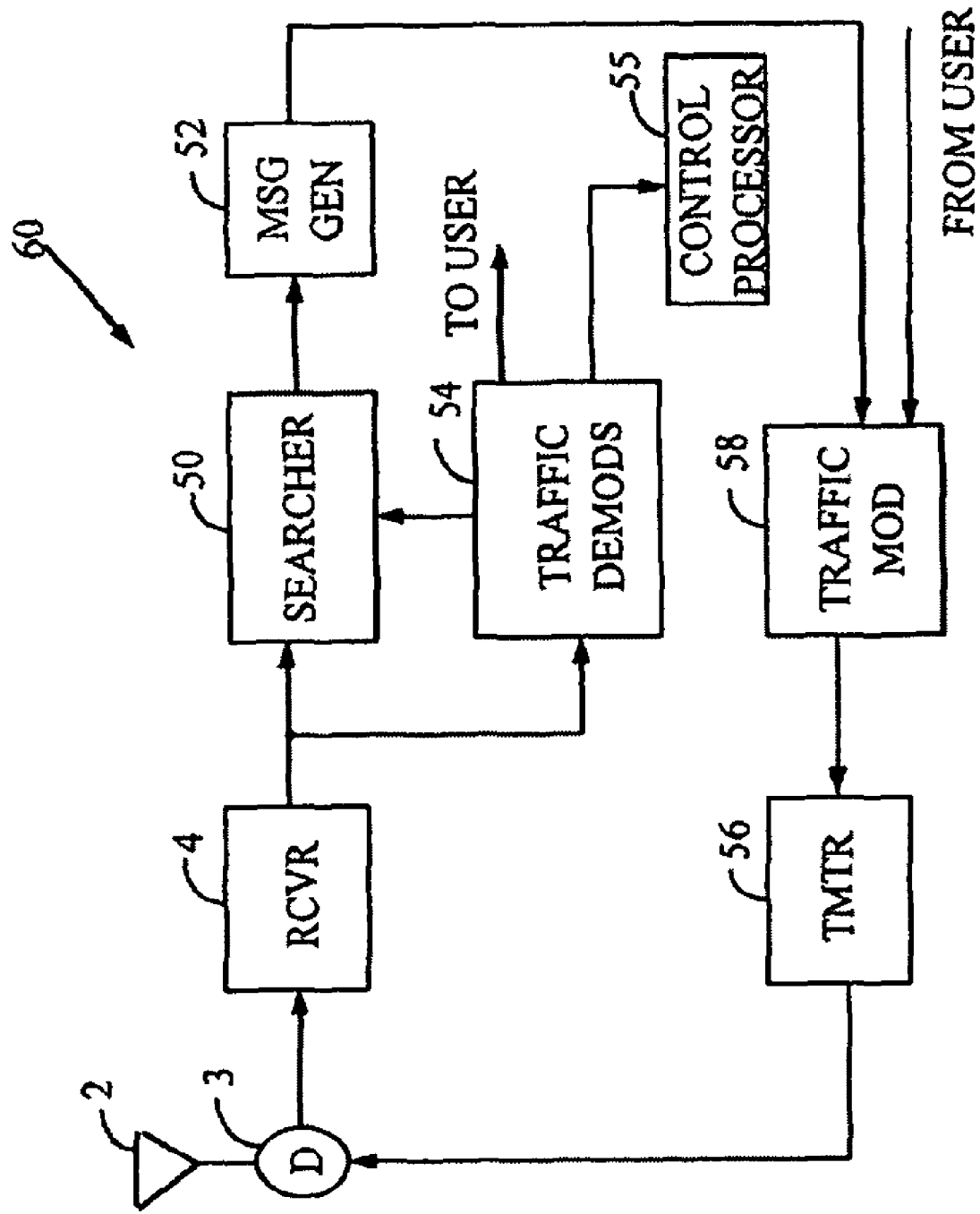
FIG. 4 is a block diagram of the mobile station of the present invention.

Referring to FIG. 4, forward link frames of data from reference base station 62 are received at antenna 2 and provided through duplexer 3 to receiver (RCVR) 4. Receiver 4 downconverts, filters and amplifies the received signal and provides it to searcher 50 and traffic demodulators (TRAFFIC DEMODS) 54. Searcher 50 searches for pilot channels in accordance with a neighbor list provided by reference base station 62. The neighbor list is provided as signaling data on the traffic channel from reference base station 62. A signal indicating the start of received frames from reference base station 62 is provided to control processor 55. Control processor 55 generates and provides a time alignment signal to traffic modulator 58 which aligns the start of frames transmitted from mobile station 60 with the start of frames received at mobile station 60.

Frames of data from the user of mobile station 60 are provided to traffic modulator 58 which in response to the timing signal from control processor 55 time aligns the frames transmitted through transmitter (TMTR) 56 with the frames received by mobile station 60 from reference base station 62. The reverse link frames are upconverted, filtered and amplified by transmitter 56 then provided through duplexer 3 for transmission through antenna 2.

Acquisition of Mobile Station by Slave Base Station

Figure 6:
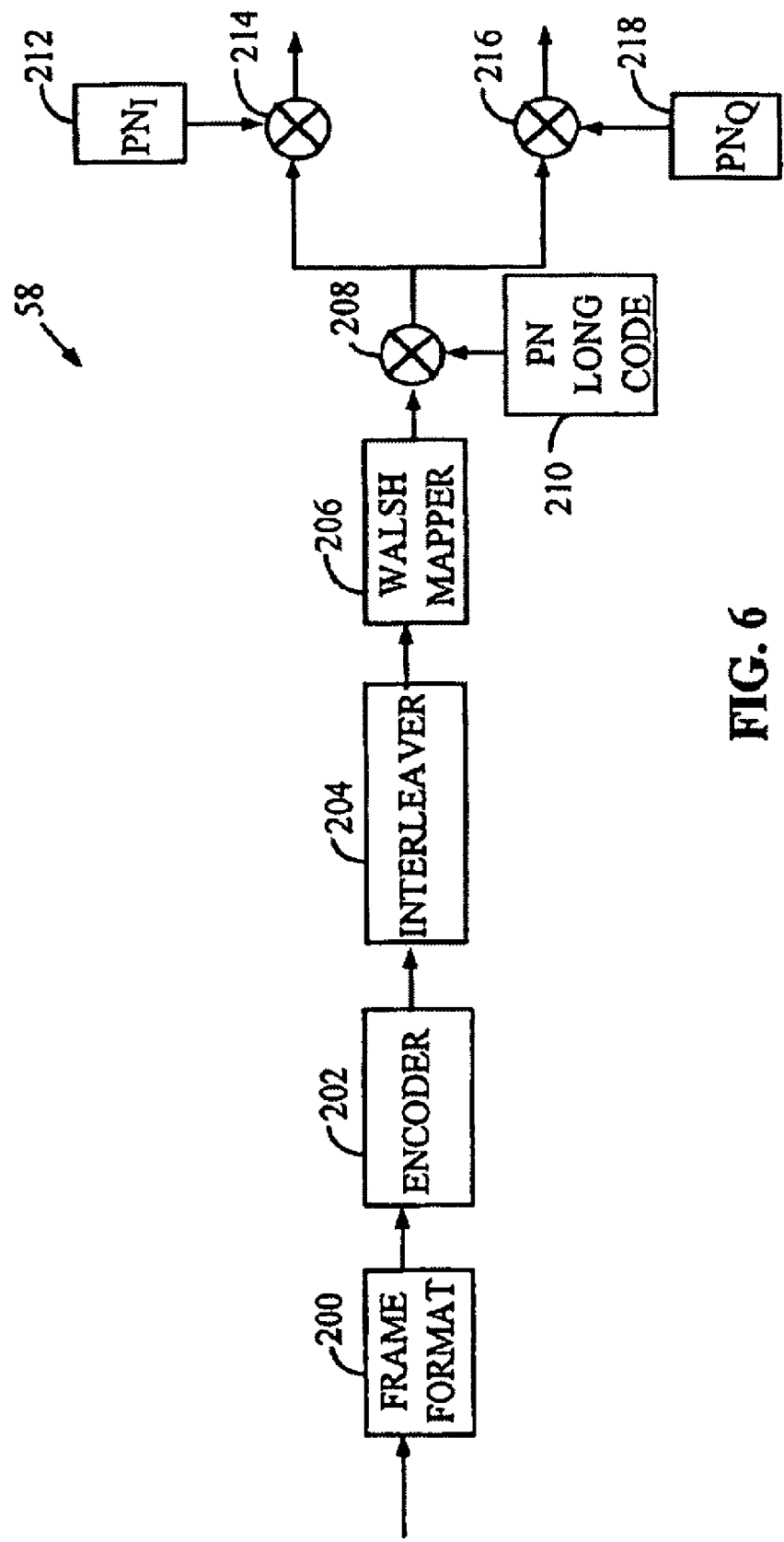
FIG. 6 is a block diagram of the traffic channel modulator of the mobile station of the present invention.

FIG. 6 illustrates the traffic channel modulator 58 of mobile station 60. Frames of data are provided to frame formatter 200. In the exemplary embodiment, frame formatter 200 generates and appends a set of cyclic redundancy (CRC) check bits and generates a set of tail bits. In the exemplary embodiment, frame formatter 200 follows the frame format protocol standardized in IS-95 and described in detail in U.S. Pat. No. 5,600,754, entitled "METHOD AND SYSTEM FOR THE ARRANGEMENT OF VOCODER DATA FOR THE MASKING OF TRANSMISSION CHANNEL INDUCED ERRORS", which is assigned to the assignee of the present invention and incorporated by reference herein.

The formatted data frame is provided to encoder 202 which encodes the data for error correction and detection. In the exemplary embodiment, encoder 202 is a convolutional encoder. The encoded data symbols are provided to interleaver 204 which reorders the symbols in accordance with a predetermined interleaving format. The reordered symbols are provided to Walsh mapper 206. In the exemplary embodiment, Walsh mapper 206 receives eight coded symbols and maps that set of symbols to a 64 chip Walsh sequence. The Walsh symbols are provided to spreading means 208 which spreads the Walsh symbols in accordance with a long spreading code. Long PN code generator 210 generates a pseudonoise (PN) sequence that spreads the data and differentiates the data from the reverse link transmitted data from other mobile stations in the vicinity.

In the exemplary embodiment, the data is transmitted in accordance with a quaternary phase shift keying (QPSK) modulation format wherein the I and Q channels are spread in accordance with a short PN sequence. The spread data is provided to spreading means 214 and 216 which perform a second spreading operation on the data in accordance with a short PN sequence provided by PN generators (PN$_I$ and PN$_Q$) 212 and 218 respectively. In step 304, slave base station 64 acquires the reverse link signal transmitted by mobile station 60. Base station controller 66 sends a signal to slave base station 64 indicating the PN code offset which mobile station 62 is using to spread its reverse link signal. In response to this signal from base station controller 66, slave base station 64 performs a search for mobile station 60 centered about the PN offset indicated by the signal from base station controller 66.

In the exemplary embodiment, slave base station 64 bank loads its searchers long code PN generator 106 and its short code PN generators 108 and 110 (illustrated in FIG. 9) in accordance with a signal from base station controller 66. The searcher process of slave base station 64 is described in detail further herein.

Figure 7:
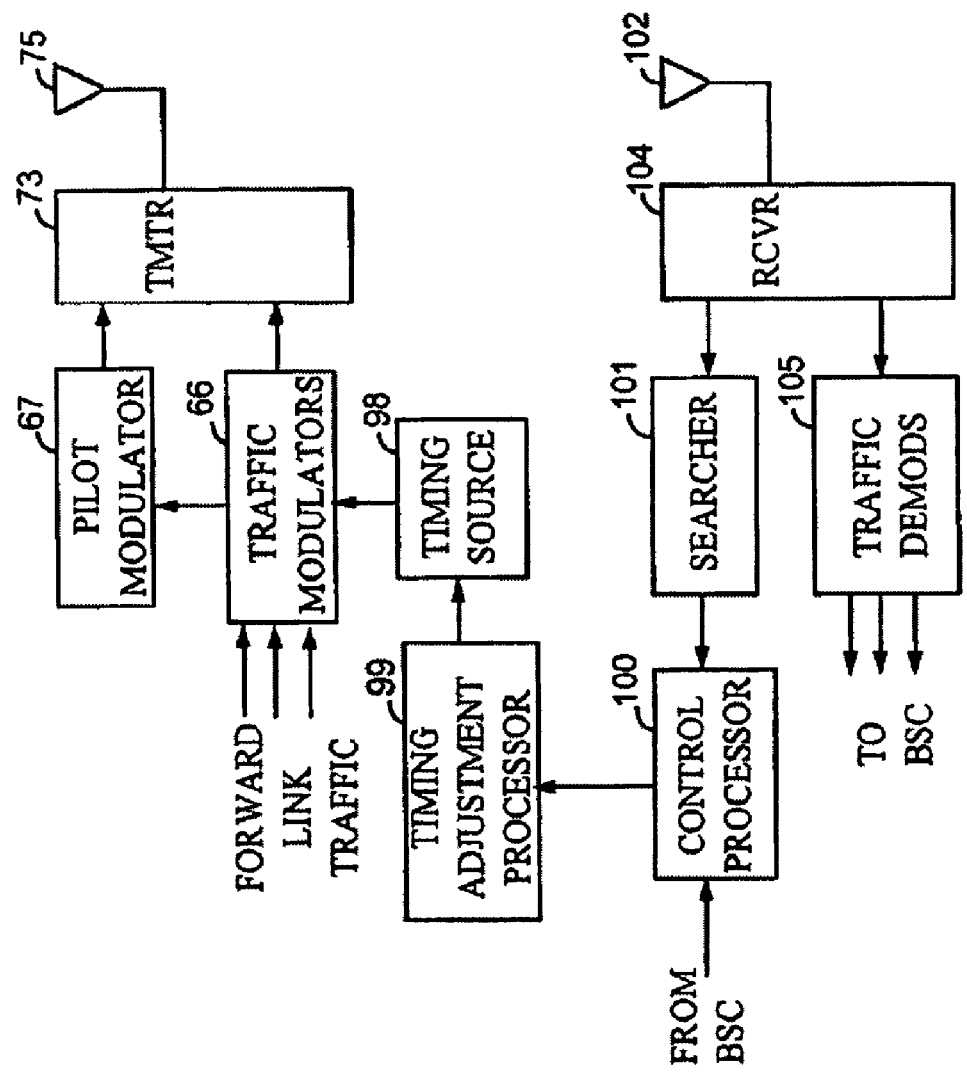
FIG. 7 is a block diagram of the base station of the present invention.
Figure 8:
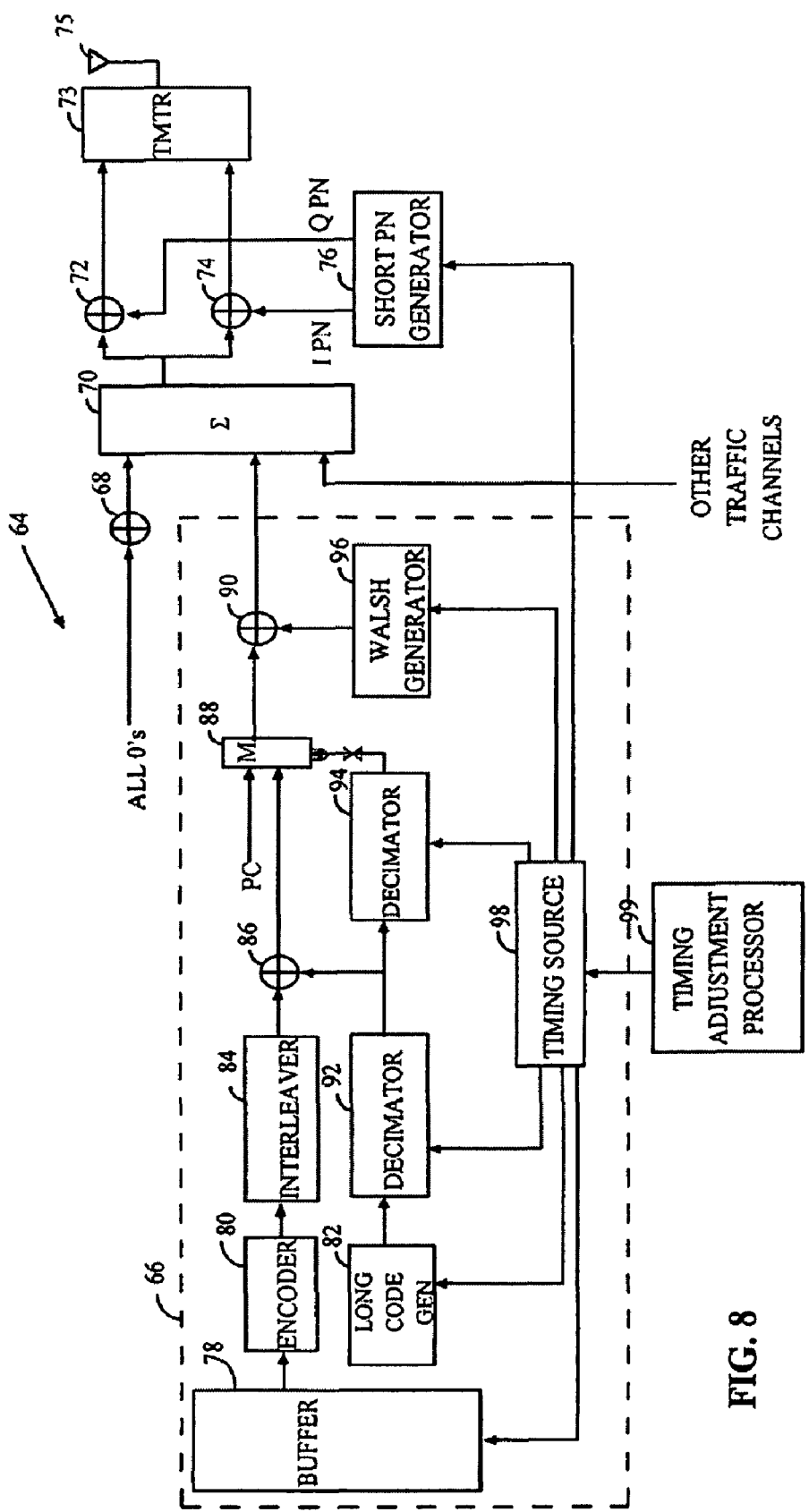
FIG. 8 is a block diagram of transmission system of the base station of the present invention.

FIG. 7 illustrates the apparatus of slave base station 64. In slave base station 64, a signal from base station controller 66 indicating the PN of mobile station 60 is received. This message is provided to control processor 100. In response thereto, control processor 100 computes the window search range centered at the specified PN offset. Control processor 100 provides the search parameters to searcher 101 and in response to those parameters slave base station 64 conducts a search for the signal transmitted by mobile station 60. The signal received by antenna 102 of slave base station 64 is provided to receiver 104 which downconverts, filters and amplifies the received signal and provides it to searcher 101. In addition, the received signal is provided to traffic demodulators 105 which demodulate the reverse link traffic data and provide that data to base station controller 60. Base station controller 66, in turn provides it to a PSTN.

Figure 9:
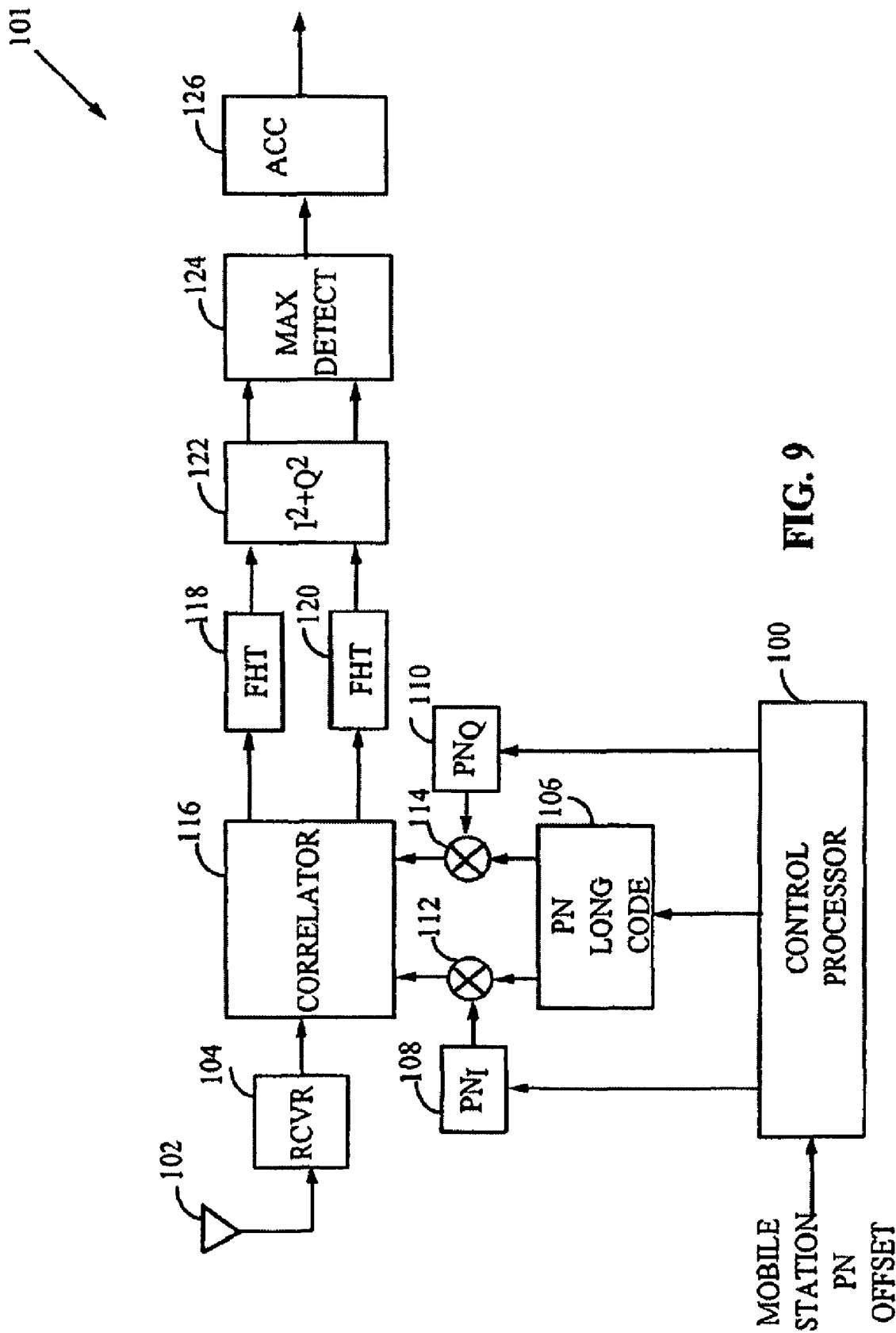
FIG. 9 is a block diagram of receiver system of the base station of the present invention.

FIG. 9 illustrates searcher 101 in greater detail. The demodulation of the reverse link signal is described in detail in co-pending U.S. patent application Ser. No. 08/372,632, filed Jan. 13, 1995, entitled "CELL SITE DEMODULATOR ARCHITECTURE FOR A SPREAD SPECTRUM MULTIPLE ACCESS COMMUNICATION SYSTEM" and in co-pending U.S. patent application Ser. No. 08/316,177, filed Sep. 30, 1994, entitled "MULTIPATH SEARCH PROCESSOR FOR A SPREAD SPECTRUM MULTIPLE ACCESS COMMUNICATION SYSTEM", both of which are assigned to the assignee of the present invention and incorporated by reference herein. An estimate of the PN offset of mobile station 60 is provided to control processor 100 from base station controller 66. In response to the PN offset estimation provided by base station controller 60, control processor 100 generates an initial long PN sequence hypothesis and an initial short PN sequence hypothesis for the search to be performed by slave base station 64. In the exemplary embodiment, control processor 100 bank loads the shift registers of PN generators 106, 108 and 110.

The signal is received by antenna 102 is downconverted, filtered and amplified by a receiver 104 and passed to correlator 116. Correlator 116 correlates the received signal to the combined long and short PN sequence hypothesis. In the exemplary embodiment, the PN sequence hypothesis is generated by multiplying the short PN hypotheses generated by PN generators 108 and 110 by the long PN sequence generated by PN generator 106 by a multiplier 112 and a multiplier 114 respectively. One of the combined PN sequence hypotheses is used to despread the I channel and the other is used to despread the Q channel of the received QPSK signal.

The two PN despread signals are provided to fast Hadamard transform (FHT) processors 118 and 120. The design and operation of fast Hadamard transform processors is described in detail in co-pending U.S. patent application Ser. No. 08/173,460, filed Dec. 22, 1993, entitled "METHOD AND APPARATUS FOR PERFORMING A FAST HADAMARD TRANSFORM", which is assigned to the assignee of the present invention and incorporated by reference herein. FHT processors 118 and 120 correlate the despread signals with all possible Walsh symbols to provide a matrix of the resultant amplitudes to energy computation means ($I^2+Q^2$) 122. Energy computation means 122 computes the energy of the amplitude matrix elements and provides the energy values to max detector 124 which selects the maximum energy correlation. The maximum correlation energies are provided to accumulator 126 which accumulates the energies for a plurality of Walsh symbols and based upon these accumulated energies, a decision is made as to whether mobile station 60 can be acquired at that PN offset.

Initial Timing Adjustment by Slave Base Station

Once mobile station 60 is acquired, then, in block 306, slave base station 64 adjusts its timing so that mobile station 60 will be able to successfully acquire its forward link transmissions. Slave base station 64 computes an initial timing adjustment by determining the difference between the PN offset at which it acquired the reverse link signal from mobile station 60 and the PN offset which reference base station 62 used for reception of the reverse link signal from mobile station 60. Using this PN offset difference, slave base station 64 adjusts the timing of its pilot signal in such a way that when mobile station 60 searches for its pilot signal it will be within the search window of mobile station 60.

Acquisition of the Slave Base Station by the Mobile Station

In searching for the mobile station signal, it is necessary for slave base station 64 to have some indication of time. In the preferred embodiment, the time error of slave base station 64 is kept at or below 1 ms by means of an alternative synchronization scheme. There are schemes which enable slave base station 64 which is incapable of receiving a GPS signal to keep time to a level of lesser precision. One possible method of obtaining a degree of initial synchronization is to manually set the time of slave base station 64 at certain intervals. A second method is to set the time using a WWV receiver, the implementation of which is well known in the art. Unlike the GPS signal, the WWV centralized timing signal is transmitted at very low frequency and is able to penetrate into tunnels and subways. However, WWV receivers are not capable of providing the degree of time synchronization necessary for providing CDMA communications.

In the exemplary embodiment, slave base station 64 adjusts its timing in accordance with the assumption that mobile station 60 is located directly adjacent to slave base station 64. Thus, the initial timing adjustment is made under the hypothesis that there will be no propagation delay between slave base station 64 and mobile station 60. Thereafter, slave base station 64 adjusts its PN sequence generators 72 and 74 forward in time which accounts for greater and greater propagation delay times between slave base station 64 and mobile station 60. Once mobile station 60 has acquired the pilot channel of slave base station 64, using normal procedures the final adjustment of timing for slave base station 64 can be performed in accordance with the computations described above.

As is known in the art and standardized in IS-95, pilot channels of different base stations are distinguished from one another by the phase of their PN generators. Reference base station 62 instructs mobile station 60 to search for slave base station 64 via the neighbor list. Reference base station 62 indicates by means of the signaling data that the pilot of slave base station 64 can be acquired at a PN phase offset which is described relative to the received PN offset of reference base station 62. This message is demodulated and decoded by traffic demodulators 54 and provided to searcher 50. In response, searcher 50 performs a search centered on a PN phase offset about the PN phase indicated in the signal from reference base station 62.

The pilot signal is typically generated by a linear feedback shift register, the implementation of which is described in detail in the aforementioned patents. In order to acquire the pilot signal from slave base station 64, mobile station 60 must synchronize to the received signals from slave base station 64 in both phase, $\phi$, and in frequency, $\omega$. The object of the searcher operation is to find the phase of the received signal, $\phi$. As described earlier, a relatively accurate frequency synchronization can be supplied to slave base station 64 by means of a T1 link from base station controller 66 as is known in the art. The method by which a mobile finds the phase of the received signal is by testing a set of phase hypotheses, referred to as a search window and determining if one of the offset hypotheses is correct.

Figure 5:
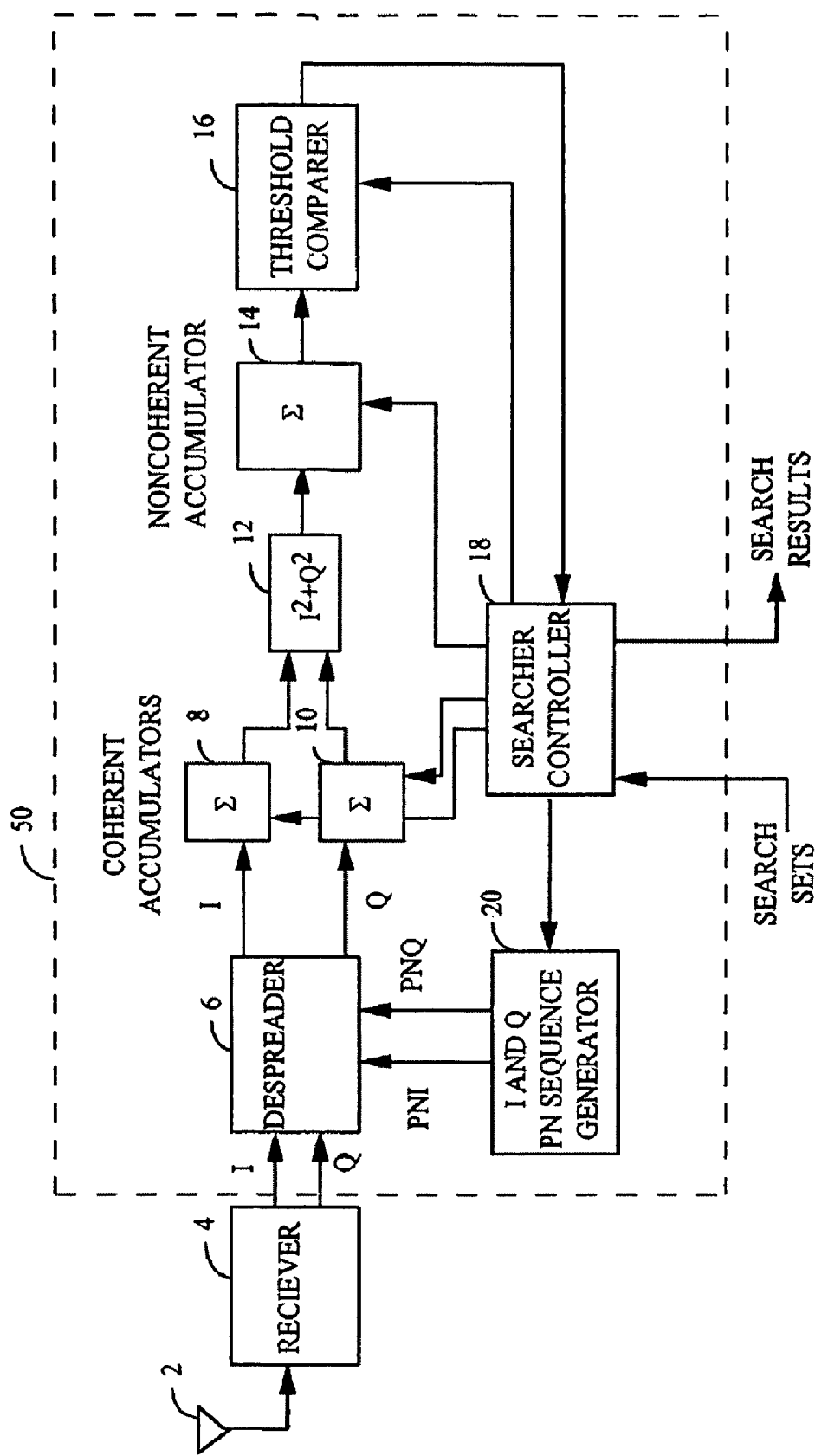
FIG. 5 is a block diagram of the searcher in the mobile station of the present invention.

FIG. 5 illustrates mobile station searcher 50 in greater detail. A spread spectrum signal is received at antenna 2. The objective of the apparatus is to gain synchronization between pseudorandom noise (PN) sequences generated by PN sequence generator 20 and the received spread spectrum signal which is spread by identical PN sequences of unknown phase transmitted by slave base station 64. In the exemplary embodiment, both pilot signal generator (not shown) and PN generator 20 are maximal length shift registers which generate the PN code sequences for spreading and despreading the pilot signals respectively. Thus, the operation of obtaining synchronization between the codes used to despread the received pilot signal and the PN spreading code of the received pilot signal involves determining the time offset of the shift register.

The spread spectrum signal is provided by antenna 2 to receiver 4. Receiver 4 downconverts, filters and amplifies the signal and provides the signal to despreading element 6. Despreading element 6 multiplies the received signal by the PN code generated by PN generator 20. Due to the random noise like nature of the PN codes, the product of the PN code and the received signal should be essentially zero except at the point of synchronization.

Searcher controller 18 provides an offset hypothesis to PN generator 20. The offset hypothesis is determined in accordance with a signal transmitted to mobile station 60 by reference base station 62. In the exemplary embodiment, the received signal is modulated by quaternary phase shift keying (QPSK), so PN generator 20 provides a PN sequence for the I modulation component and a separate sequence for the Q modulation component to despreading element 6. Despreading element 6 multiplies the PN sequence by its corresponding modulation component and provides the two output component products to coherent accumulators 8 and 10.

Coherent accumulators 8 and 10 sum the product over the length of the product sequence. Coherent accumulators 8 and 10 are responsive to signals from searcher controller 18 for resetting, latching and setting the summation period. The sums of the products are provided from summers 8 and 10 to squaring means 12. Squaring means 12 squares each of the sums and adds the squares together.

The sum of the squares is provided by squaring means 12 to non-coherent combiner 14. Noncoherent combiner 14 determines an energy value from the output of squaring means 12. Noncoherent accumulator 14 serves to counteract the effects of a frequency discrepancy between the base station transmit clocks and the mobile station receive clock and aids in the detection statistic in a fading environment. Noncoherent accumulator 14 provides the energy signal to comparison means 16. Comparison means 16 compares the energy value to predetermined thresholds supplied by searcher controller means 18. The results of each of the comparisons is then feedback to searcher controller 18. The results fed back to searcher controller 18 include both the energy of the correlation and the PN offset that resulted in the measurement.

In the present invention, searcher controller 18 outputs the PN phase at which it synchronized to base station 64. This offset is used to compute the time error as described further herein.

In the exemplary embodiment, when mobile station 60 acquires slave base station 64 it computes the difference between the time it received the signal from slave base station 64 and the time it received the signal from reference base station 62. This value is provided to message generator 52 which generates a message indicative of the difference value. The message is transmitted as signaling data on the reverse link to reference base station 62 and slave base station 64 which send the message back to base station controller 66.

Measurement of Delay Between Transmission of Forward Link Signal from Slave Base Station and Receipt of Reverse Link Signal at Slave Base Station In step 311, slave base station 64 measures the difference between the time the slave base station received the reverse link signal from mobile station 60 ($T_2$) and the time the slave base station transmitted its forward link signal to mobile station 60 ($T_0$). Slave base station 64 stores the PN offset at the time it transmits its forward link signal and upon detection of the reverse link signal from mobile station 60 computes the time difference $RTD_2$. In the exemplary embodiment, this computed time difference is provided by slave base station 64 to base station controller 66 and the computation of the timing adjustment is conducted at base station 66. It will be understood by one skilled in the art that the present invention is easily extended to the case wherein the computations are performed at the base stations or mobile stations controllers.

Timing Adjustment of Slave Base Station

Base station controller 66, in response, performs the computation described in equation (12) and sends an indication of the necessary timing adjustment to slave base station 64. Referring back to FIG. 7, the timing adjustment signal is received by slave base station 64 at control processor 100. Control processor 100 generates and provides a control signal to timing adjustment processor 99. Timing adjustment processor 99 generates a signal which changes the time of timing source 98 by the amount indicated in the signal from base station controller 66.

Time Transfer when not in Soft Handoff

The above adjustment procedure is valid for the case in which a mobile station 60 is in soft handoff (i.e., when the mobile station has established links with both reference base station 62 and slave base station 64). Establishing links with both reference and slave base stations allows reference base station 62 to determine the $RTD_1$ and slave base station 64 to determine the $RTD_2$. From the values of $RTD_1$ and $RTD_2$, an estimate of the time error $T_0'-T_0$ can be made. However, in accordance with one embodiment of the present invention, slave base station 64 can be synchronized with reference base station 62, as follows, when mobile station 60 is not in communication with both reference base station 62 and slave base station 64.

Assuming that a mobile station 60 is communicating with reference base station 62, the value of $RTD_1$ can be determined as described above. In addition, mobile station 60 and reference base station 64 are preferably in communication through base station controller 66. The long PN code with which mobile station 60 spreads its reverse link transmission to the reference base station 62 is known to reference base station 62. In accordance with the present invention, reference base station 62 communicates the long PN code to the slave base station 64 through the base station controller 66. In addition, using the communication path through the base station controller 66, reference base station 62 sends to the slave base station 64 a list of values of $RTD_1$ each being associated with one long PN code used by one mobile station 60 to spread the reverse link transmitted by mobile station 60 in communicating with reference base station 62. It should be understood that each mobile station 60 will be associated with one particular long PN code and $RTD_1$ value. Slave base station 64 then uses the long PN code information to attempt to receive one or more of the reverse link transmissions from the mobile stations 60. Since the mobile stations 60 are not in soft handoff, the signal received by slave base station 64 from mobile stations 60 will be weak. Therefore, slave base station 64 will typically need be accumulate a large number of PN chips in order to detect a mobile station 60 that is being serviced by reference base station 62.

Slave base station 64 searches for mobile stations 60 one at a time based upon the long PN codes that slave base station 64 received from reference base station 62. Therefore, if after a reasonable amount of time, slave base station 64 has been unsuccessful in detecting a reverse link transmission from a first mobile station 60, then slave base station 64 begins searching for a reverse link transmission from a second mobile station 60. In accordance with one embodiment of the present invention, reference base station 62 assists in determining which of the mobile stations 60 slave base station 64 is most likely to be able to detect. This is preferably done by determining the distance of the mobile stations 60 from reference base station 62. In addition, information regarding the sector from which each mobile station 60 is transmitting is used. That is, if the mobile station is at a relatively great distance from the reference station (as indicated, for example, by information attained while performing a power control algorithm), and the mobile station 60 is in a sector that is adjacent to slave base station 64, then there is a greater likelihood that mobile station 60 will be detected by slave base station 64. It should be clear that by reference base station 62 assisting in determining which mobile stations 60 are most likely to be detected by slave base station 64, the amount of time required for slave base station 64 to detect a mobile station is reduced.

Once slave base station 64 has acquired the transmission from the mobile station over the reverse link, slave base station 64 determines the arrival time of the reverse link transmission, $T_2$, and obtains an estimate of $\tau_2$ (the delay from mobile station 60 to slave base station 64) which is denoted by $\gamma_2$. Slave base station 64 then estimates $$T_0' = T_2 - (\gamma_2 + \tau_1) = T_2 - \left(\gamma_2 + \frac{RTD_1}{2}\right).$$

It should be noted that $\gamma_2$ is not directly measured. If the location of mobile station 60 is known, then $\gamma_2$ can be estimated based upon the distance between the mobile station 60 and the slave base station 64, since the location of the slave base station is known. If the location of mobile station 60 is not known, $\gamma_2$ can be estimated from a table of values or from a database based upon experience. That is, the path loss between mobile station 60 and slave base station 64 can be used to estimate $\gamma_2$. The path loss can be determined by measuring the amount of power that is transmitted and received at slave base station 64. Alternatively, the strength of the signal received at mobile station 60 (such as a pilot signal which is transmitted by slave base station 64 and received by mobile station 60) can be used to determine the path loss between mobile station 60 and slave base station 64. In such an embodiment of the present invention, mobile station 60 transmits an indication of the strength of the signal received to the slave base station over the reverse link.

The time error is equal to the value of $\gamma_2$ minus $\tau_2$. Therefore, the time transfer accuracy is directly related to the accuracy of $\gamma_2$. The estimate typically is accurate to less than the cell radius. That is, the difference between the estimate of $\gamma_2$ and the actual value of $\gamma_2$ is less than the cell radius. Thus, for a cell with a radius of K miles, the timing error due to $\tau_2$ is about 5 K µs.

In spite of the inaccuracy of the estimate of $\gamma_2$, this method of time transfer can provide better timing than can be provided by many other means, such as by the backhaul. Therefore, estimating $\gamma_2$ in accordance with the present invention as described above can reduce the size of the search windows, and thus ensure that the windows are not excessive. The present invention also provides timing that is accurate enough that the received signals from two base stations do not arrive with the same pilot PN phase, thus allowing pilots from different origins to be distinguished.

It should also be noted that a complementary procedure may be used if mobile station 60 is communicating with slave base station 64, and not with reference base station 64. In such a case, $\tau_1$ needs to be estimated instead of $\tau_2$.

Initialization of Slave Base Station

The above adjustment procedure is valid for the case in which the slave base station system time is relatively close to the reference base station system time. However, in some cases, the difference between the reference base station system time and the reference base station system time will be so great as to make this procedure invalid. For example, when the slave base station first becomes operational, the system time must be initialized. Without an external reference, the slave base station system time will be an arbitrary value. In another instance, when there is no mobile station in the region between the reference base station and the slave base station for a relatively long period of time, the slave base station system time may accumulate a significant error (i.e., drift from the reference base station system time by a significant amount) due to the oscillator which maintains the system time drifting with respect to the reference used by the reference base station. In such cases, the following initialization procedure is provided in accordance with the present invention.

When a slave base station 64 is first powers on, that slave base station 64 may not have the appropriate timing, since no time transfer has yet occurred between the slave base station 64 and any external timing reference, such as a GPS signal source or a reference base station 62. Therefore, in accordance with one embodiment of the present invention, when power is first applied to slave base station 64, the forward link to be transmitted from that slave base station is not enabled. Initial timing is preferably obtained using the backhaul, assuming that no more accurate means is available. The slave base station 64 then has a reasonable estimate as to the proper timing which is sufficient to allow the slave base station 64 to acquire timing via the reverse link method described above in section VIII. Once this has been done, slave base station 64 enables the forward link transmission at low power. If a mobile station 60 is in the soft handoff region, then the mobile station 60 reports the presence of the new pilot and time can be transferred using the more accurate soft handoff method of the present invention, as described above. Once this is done, the forward link power of this base station can be increased to the normally operating power appropriate to the slave base station 64.

The invention claimed is:

1. A method for time synchronizing a second base station with a first base station comprising:
   measuring a round trip delay interval of transmissions from the first base station to a mobile station in communication with the first base station and back from the mobile station to the first base station;
   receiving at the second base station communications transmitted by the mobile station and noting the time of reception;
   sending a message indicative of the identity of the mobile station from the first base station to the second base station, comprising:
      receiving at the first base station communications from a plurality of mobile stations;
      selecting a mobile station most likely to be able to communicate with the second base station furthest from the first base station; and
      sending the message indicative of the identity of the mobile station;
   determining an estimate of a delay which occurs between transmission by the mobile station and reception by the second base station; and
   computing a timing correction value in accordance with said estimate of the delay, said noted time of reception, and said measured round trip delay interval.

2. An apparatus for time synchronizing a second base station with a first base station comprising:
   a first base station configured to:
      measure a round trip delay interval of transmissions from said first base station to a mobile station in communication with said first base station and back from the mobile station to said first base station;
      receive communications from a plurality of mobile stations;
      select a mobile station most likely to be able to communicate with said second base station as a mobile station closest from said first base station; and
      send a message indicative of the identity of the selected mobile station to said second base station;
   a second base station configured to:
      receive communications transmitted by the mobile station and noting the time of reception;
      determine an estimate of a delay which occurs between transmission by the mobile station and reception by said second base station; and
      compute a timing correction value based upon the estimate of the delay, the time of reception, and the measured round trip delay interval.

3. A method for synchronizing a base station with a wireless communication system upon the base station's power up, comprising:
   disabling a transmission from the base station;
   obtaining initial timing at the base station;

receiving at the base station signals transmitted from a mobile station;

providing the mobile station with an identity of the base station;

transmitting signals at successively increasing power levels from the base station in accordance with an adjusted timing until the mobile station detects the transmitted signals; and synchronizing timing of the base station with another base station communicating with the mobile station, comprising:

measuring a round trip delay interval of transmissions from the another base station to the mobile station and back from the mobile station to the another base station;

receiving at the base station communications transmitted by the mobile station and noting the time of reception;

determining an estimate of a delay which occurs between transmission by the mobile station and reception by the base station; and computing a timing correction value in accordance with the estimate of the delay, the noted time of reception, and the measured round trip delay interval.

4. The method of claim 3 wherein said obtaining initial timing at the base station comprises:

obtaining initial timing at the base station in accordance with a timing signal provided from a base station controller.

5. The method of claim 3 wherein said obtaining initial timing at the base station comprises:

obtaining initial timing at the base station in accordance with a timing signal provided from a WWW receiver.

6. The method of claim 3 wherein said obtaining initial timing at the base station comprises:

obtaining initial timing at the base station in accordance with an intermittent timing signal.

7. The method of claim 3, wherein receiving at the base station signals transmitted from a mobile station further comprises:

obtain information about identity of the mobile station;

estimating at the base station distance to the mobile station; and receiving at the base station signals transmitted from the mobile station in accordance with said provided information and said estimated distance.

8. The method of claim 7 wherein said estimating at the base station distance to the mobile station comprises:

estimating at the base station time delay to the mobile station.

9. The method of claim 7 wherein said estimating at the base station distance to the mobile station comprises:

assuming that the mobile station is located adjacent to the base station.

10. The method of claim 7 wherein said estimating at the base station distance to the mobile station comprises:

estimating at the base station distance to the mobile station in accordance with a round trip delay interval of transmissions from a first base station to the mobile station in communication with the first base station and back from the mobile station to said first base station.

11. The method of claim 7 wherein said estimating at the base station distance to the mobile station comprises:

estimating at the base station distance to the mobile station in accordance with:

a first round trip delay interval of transmissions from a first base station to the mobile station in communication with the first base station and back from the mobile station to the first base station; and a second round trip delay interval of transmissions from a second base station to the mobile station in communication with the second base station and back from the mobile station to the second base station.

12. The method of claim 3, wherein adjusting timing of the base station in accordance with said received signals further comprises:

adjusting timing of the base station in accordance with a time offset between an estimated PN offset of the mobile station and an actual PN offset of the mobile station.

13. The method of claim 3, wherein providing the mobile station with an identity of the base station further comprises:

providing the mobile station with a pilot PN code offset.

14. The method of claim 3, wherein providing the mobile station with an identity of the base station further comprises:

providing the mobile station with a pilot PN code.

15. The method of claim 3, wherein synchronizing timing of the base station with the another base station communicating with the mobile station further comprises:

initiating a communication between the base station and the mobile station;

measuring a first round trip delay interval of transmissions from the base station to the mobile station in communication with the base station and back from the mobile station to the base station;

measuring a second round trip delay interval of transmissions from the another base station to the mobile station and back from the mobile station to the another base station;

measuring at the mobile station a time difference between the time of receipt of a transmission from the another base station and the time of receipt of a transmission from the base station; and computing a timing correction value based upon the measured first round trip delay interval, the measured second round trip delay interval, and the measured time difference.

16. The method of claim 3, further comprising:

repeating said synchronizing timing of the base station with at least one base station communicating with the mobile station for all mobile stations within the coverage area of the base station.

17. An apparatus for synchronizing a base station with a wireless communication system upon the base station's power up, comprising:

a transmitter;

a processor communicatively coupled to said transmitter;

a receiver, communicatively coupled to the processor, configured to receive signals transmitted from a mobile station; and a storage medium coupled to said processor and containing a set of instructions executable by said processor to:

disable said transmitter;

obtain initial timing; and synchronize timing of the base station with another base station communicating with the mobile station, comprising:

initiating a communication between the base station and the mobile station;

measuring a first round trip delay interval of transmissions from the base station to the mobile station in communication with the base station and back from the mobile station to the base station;

measuring a second round trip delay interval of transmissions from the another base station communicating with the mobile station and back from the mobile station to the another base station communicating with the mobile station; and computing a timing correction value in accordance with the first round trip delay interval and the second round trip delay interval.

18. The apparatus of claim 17 wherein said processor obtains initial timing by executing a set of instructions to:
obtain initial timing in accordance with a timing signal provided from a base station controller.

19. The apparatus of claim 17 wherein said processor obtains initial timing by executing a set of instructions to:
obtain initial timing in accordance with a timing signal provided from a WWW receiver.

20. The apparatus of claim 17 wherein said processor obtains initial timing by executing a set of instructions to:
obtain initial timing in accordance with an intermittent timing signal.

21. The apparatus of claim 17 wherein said processor further executes a set of instructions to:
obtain information about identity of the mobile station; and
estimate a distance from the base station to the mobile station; and wherein the receiver is further configured to:
receive signals transmitted from the mobile station in accordance with the provided information and the estimated distance.

22. The apparatus of claim 21 wherein said processor estimates a distance from the base station to the mobile station by executing a set of instructions to:
estimate a time delay between the base station and the mobile station.

23. The apparatus of claim 21 wherein said processor estimates a distance from the base station to the mobile station by executing a set of instructions in accordance with an assumption that the mobile station is located adjacent to the base station.

24. The apparatus of claim 21 wherein said processor estimates a distance from the base station to the mobile station by executing a set of instructions to:
estimate distance from the base station to the mobile station in accordance with a round trip delay interval of transmissions from a first base station to the mobile station in communication with said first base station and back from the mobile station to said first base station.

25. The apparatus of claim 21 wherein said processor estimates a distance from the base station to the mobile station by executing a set of instructions to:
estimate a first round trip delay interval of transmissions from a first base station to the mobile station in communication with said first base station and back from the mobile station to said first base station; and
estimate a second round trip delay interval of transmissions from a second base station to the mobile station in communication with said second base station and back from the mobile station to the second base station.

26. The apparatus of claim 17 wherein said processor adjusts timing of the base station in accordance with said received transmission by executing a set of instructions to:
adjust timing of the base station in accordance with a time offset between an estimated PN offset of the mobile station and an actual PN offset of the mobile station.

27. The apparatus of claim 17 further comprising:
a mobile station configured to obtain information about identity of the base station; and
said transmitter configured to transmit signals at successively increasing power levels from the base station in accordance with the adjusted timing until the mobile station detects the transmitted signals.

28. The apparatus of claim 27 wherein the mobile station is configured to obtain information about a pilot PN code offset of the base station.

29. The apparatus of claim 27 wherein the mobile station is configured to obtain information about a pilot PN code of the base station.

30. The apparatus of claim 29 wherein said processor repeats said synchronizing timing of the base station with at least one base station communicating with the mobile station for all mobile stations within the coverage area of the base station.

31. The apparatus of claim 17 said processor further executes a set of instructions to synchronize timing of the base station with at least one base station communicating with said mobile.

32. The apparatus of claim 17, wherein the mobile station is configured to measure a time difference between the time of receipt of a transmission from the another base station communicating with the mobile station and the time of receipt of a transmission from the base station; and
the processor is further configured to compute the timing correction value in accordance with the time difference provided by the mobile station.

33. An apparatus for time synchronizing a second base station with a first base station comprising:
means for measuring a round trip delay interval of transmissions from the first base station to a mobile station in communication with the first base station and back from the mobile station to the first base station;
means for receiving at the second base station communications transmitted by the mobile station and noting the time of reception;
means for sending a message indicative of the identity of the mobile station from the first base station to the second base station, comprising:
means for receiving at the first base station communications from a plurality of mobile stations;
means for selecting a mobile station most likely to be able to communicate with the second base station furthest from the first base station; and
means for sending the message indicative of the identity of the mobile station;
means for determining an estimate of a delay which occurs between transmission by the mobile station and reception by the second base station; and
means for computing a timing correction value in accordance with said estimate of the delay, said noted time of reception, and said measured round trip delay interval.

34. A processor-readable non-transitory medium having one or more instructions which when executed by one or more processors causes the one or more processors to:
measure a round trip delay interval of transmissions from a first base station to a mobile station in communication with the first base station and back from the mobile station to the first base station; receive at a second base station communications transmitted by the mobile station and noting the time of reception; send a message indicative of the identity of the mobile station from the first base station to the second base station, by: receiving at the first base station communications from a plurality of mobile stations; selecting a mobile station most likely to be able to communicate with the second base station furthest from the first base station; and sending the message indicative of the identity of the mobile station; determine an estimate of a delay which occurs between transmission by the mobile station and reception by the second base station; and compute a timing correction value in accordance with said estimate of the delay, said noted time of reception, and said measured round trip delay interval.

35. An apparatus for synchronizing a base station with a wireless communication system upon the base station's power up, comprising:

means for disabling a transmission from the base station;
means for obtaining initial timing at the base station;
means for receiving at the base station signals transmitted from a mobile station;
means for providing the mobile station with an identity of the base station;
means for transmitting signals at successively increasing power levels from the base station in accordance with an adjusted timing until the mobile station detects the transmitted signals; and
means for synchronizing timing of the base station with another base station communicating with the mobile station, comprising:
  means for measuring a round trip delay interval of transmissions from the another base station to the mobile station and back from the mobile station to the another base station;
  means for receiving at the base station communications transmitted by the mobile station and noting the time of reception;
  means for determining an estimate of a delay which occurs between transmission by the mobile station and reception by the base station; and
  means for computing a timing correction value in accordance with the estimate of the delay, the noted time of reception, and the measured round trip delay interval.

36. A processor-readable non-transitory medium having one or more instructions which when executed by one or more processors causes the one or more processors to:

disable a transmission from the base station; obtain initial timing at the base station; receive at the base station signals transmitted from a mobile station; provide the mobile station with an identity of the base station; transmit signals at successively increasing power levels from the base station in accordance with an adjusted timing until the mobile station detects the transmitted signals; and synchronize timing of the base station with another base station communicating with the mobile station, by: measuring a round trip delay interval of transmissions from the another base station to the mobile station and back from the mobile station to the another base station; receiving at the base station communications transmitted by the mobile station and noting the time of reception; determining an estimate of a delay which occurs between transmission by the mobile station and reception by the base station; and computing a timing correction value in accordance with the estimate of the delay, the noted time of reception, and the measured round trip delay interval.

* * * * *